Nov. 28, 1967  P. U. LANNERD  3,355,103
REVERSING MECHANISM FOR DIGITAL COUNTERS
Filed March 22, 1961  4 Sheets-Sheet 1

INVENTOR.
PAUL U. LANNERD
BY
ATTORNEYS

INVENTOR.
PAUL U. LANNERD

Nov. 28, 1967          P. U. LANNERD          3,355,103

REVERSING MECHANISM FOR DIGITAL COUNTERS

Filed March 22, 1961                         4 Sheets-Sheet 4

INVENTOR.
PAUL U. LANNERD
BY
H. H. Lesche
Paul S. Collignon
ATTORNEYS

United States Patent Office 3,355,103
Patented Nov. 28, 1967

3,355,103
REVERSING MECHANISM FOR
DIGITAL COUNTERS
Paul U. Lannerd, 4541 College Ave., Indianapolis, Ind. 46205; Robert Paul Lannerd, administrator of said Paul U. Lannerd, deceased
Filed Mar. 22, 1961, Ser. No. 97,704
5 Claims. (Cl. 235—103)

The invention described herein may be manufactured and used by or for the Government of the United States of America for governmental purposes without the payment of any royalties thereon or therefor.

The present invention relates to a digital counter and more particularly to a counter that will reverse the direction of rotation of reading and printing wheels when a zero condition is reached.

Various situations exist where it is desirable to read and/or permanently record changeable conditions, such as temperature or direction of travel. As temperature has both a plus and minus reading, it is necessary to either reverse directions of the reading and printing wheels at zero condition, or else provide two sets of output wheels. Likewise, it is often desirable to indicate direction as a deviation from a particular direction, such as true north, and after an angle of 180 degrees is reached, the angle decreases, thus requiring a reversal of the output wheels.

One heretofore known device is shown in U.S. Patent 2,829,532, which relates to a reversing mechanism for a longitude and latitude navigation counter. This device employs a face type cam and cam follower which shift a slidable gear to engage an idler gear and thus reverse directions. However, this device has a disadvantage in that the mechanism reverses each revolution of the face cam. Consequently, it is necessary to gear down the input in order that the desired motion be obtained.

Another heretofore known device employs two sets of output wheels and a shutter that alternately covers one set of wheels that is registering an erroneous value. The disadvantage of this device is that many extra parts are required due to the duplicate set of output wheels.

The present invention provides an input shaft that drives, through appropriate gearing, one or more memory gears that determine a zero position. At this zero position, a barrel-type cam is rotated a partial revolution and in turn drives a yoke that shifts a gear to engage a rotating driver and to disengage an opposite-rotating driver. Three outputs can be provided, namely, a visual output, a printed output, and a graph output.

It is therefore a general object of the present invention to provide an improved reversing mechanism for a digital counter.

Another object of the present invention is to provide a mechanism that will provide a visual output reading, and also provide means for printing a permanent record.

Another object of the present invention is to provide a mechanism that will print a graph of a changing condition.

A further object of the present invention is to provide an improved mechanism for reversing the rotation of a set of digital reading wheels at a zero position without digital loss.

Still another object of the present invention is to provide a counter with a memory mechanism for determining a reversing position for an output gear.

Other objects and advantages of the present invention will be readily appreciated as the same becomes better understood by reference to the following detailed description when considered in connection with the accompanying drawing wherein.

Figure 1:
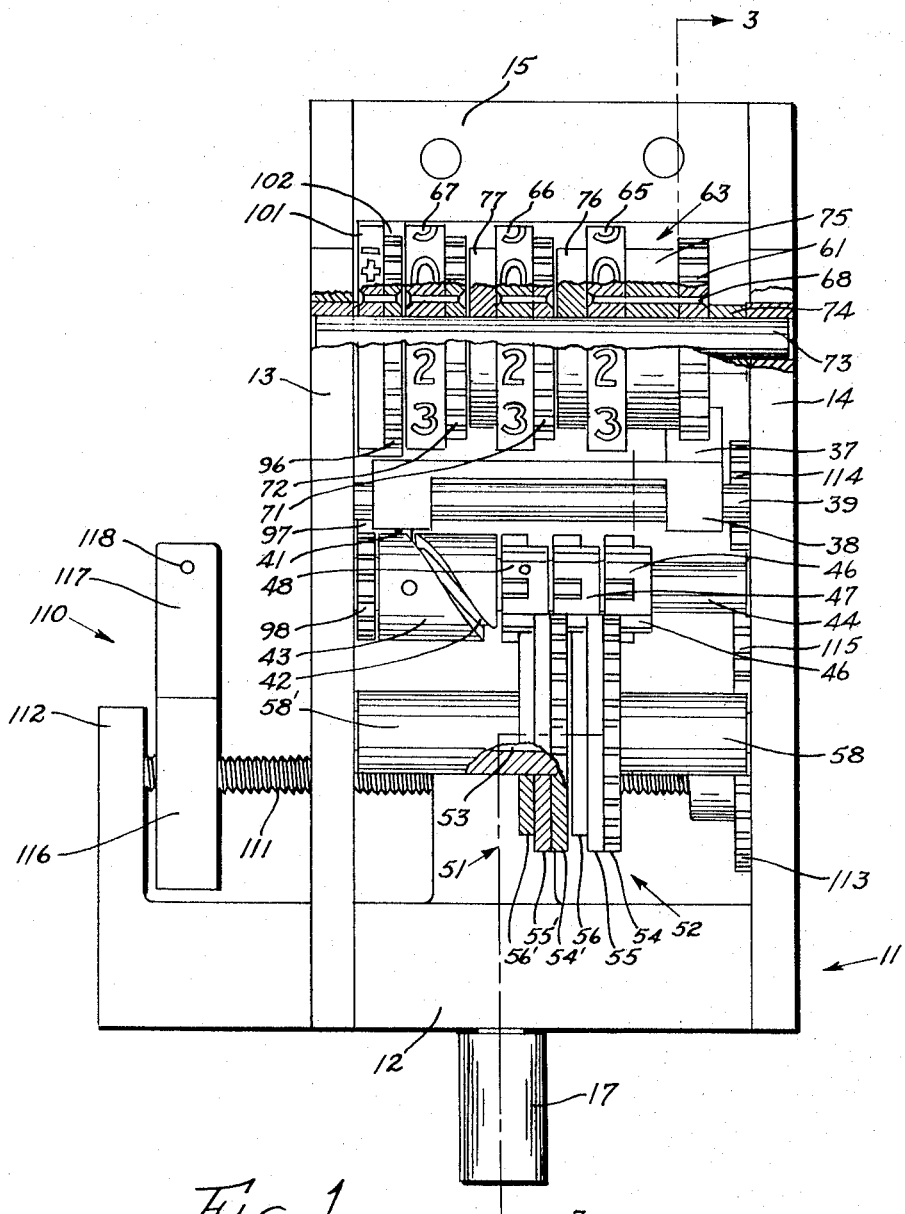
FIG. 1 is a front view of an embodiment of the present invention.
Figure 2:
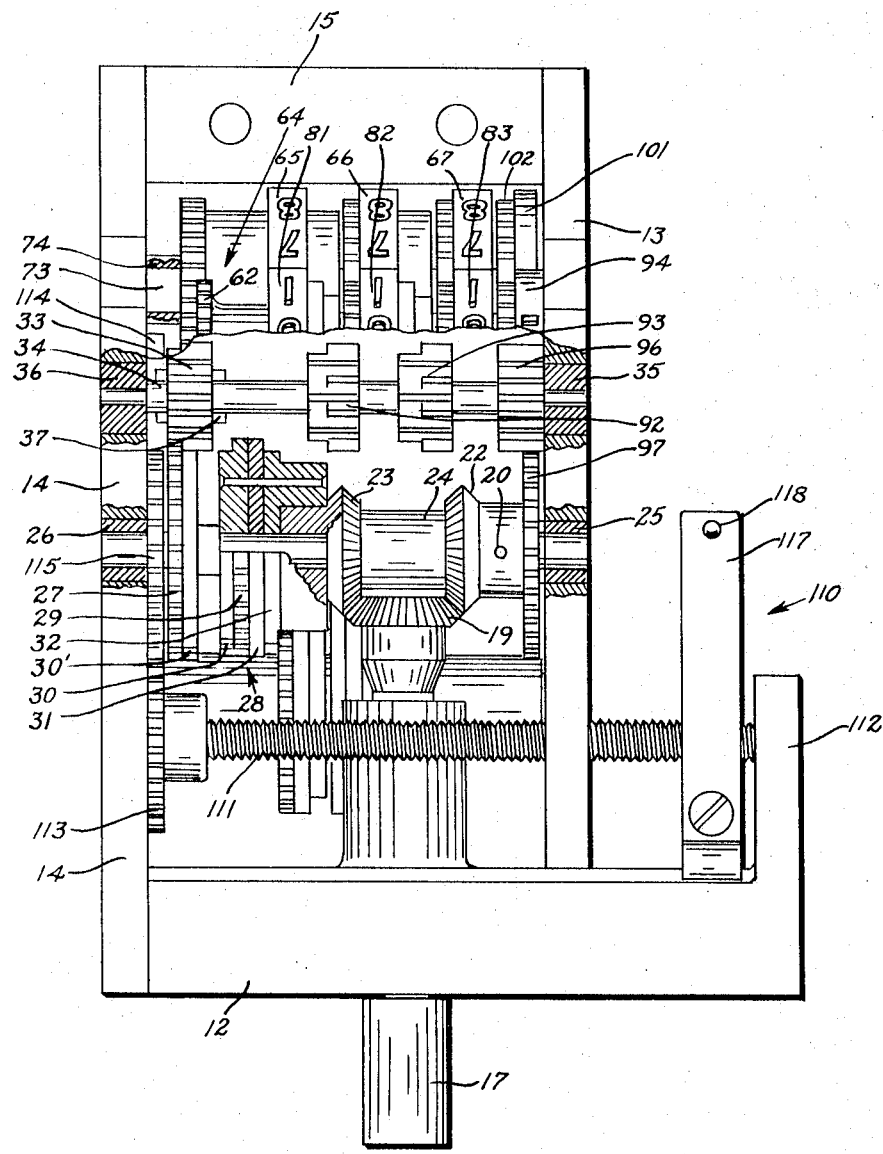
FIG. 2 is a rear view of the device shown in FIG. 1 with certain members being removed so that other members may be more clearly shown.

Referring now to the drawings, which show a preferred embodiment of the present invention, there is shown a housing 11, which is comprised of base 12, side walls 13 and 14, and top brace 15. An input shaft 16 is rotatably supported by base 12 and a suitable input coupling 17 is attached to the input end, by means of pin 18. A bevel gear 19 is attached to the other end of shaft 16 by means of pin 21. Bevel gears 22 and 23, which are supported by shaft 24, are engaged with bevel gear 19 and are driven in opposite directions. Shaft 24 is rotatably supported in bushings 25 and 26, which are housed in side walls 13 and 14, respectively, and as bevel gear 22 is locked to shaft 24 by means of pin 20, rotation of bevel gear 22 causes shaft 24 to be rotated. A spur gear 27 is locked to shaft 24 by any conventional means, such as a pin or set screw, and rotation of bevel gear 22 causes spur gear 27 to be rotated.

A reversing drive assembly 28 is also supported by shaft 24 and is attached, as by a press fit, to bevel gear 23. Drive assembly 28 consists of spur gear 29, lock plate 31, and geneva gear 32. As drive assembly 28 is freely running on shaft 24, it can be seen that spur gears 27 and 29 rotate in opposite directions. A reversing gear 33 is slidably positioned on shaft 34, which is rotatably mounted in bushings 35 and 36. Reversing gear 33 is positioned between a forked arm 37, which is part of a yoke 38. Yoke 38 is slidably mounted on shaft 39 and a lug 41, that is on the bottom of yoke 38, engages a cam groove 42 on barrel cam 43. Cam 43 is attached to shaft 44, and rotation of shaft 44 rotates cam 43, which in turn causes a lateral motion to be transmitted to yoke 38. Movement of yoke 38, in turn, causes lateral movement of reversing gear 33. Gear 33 can thus be moved so that it will engage and disengage spur gears 27 and 29. That is, if reversing gear 33 is engaged with spur gear 27 and yoke 38 moves toward spur gear 29, reversing gear 33 will disengage spur gear 27 and become engaged with spur gear 29. Likewise, if reversing gear 33 is engaged with spur gear 29 and yoke 38 moves toward spur gear 27, reversing gear 33 will disengage spur gear 29 and become engaged with spur gear 27. To facilitate the engagement of gears 27 and 29, and in order to insure that the relationship between reversing gear 33 and spur gears 27 and 29 is maintained, gears 27 and 29 are each provided with a pair of transfer teeth 30' and 30, respectively that extend laterally beyond the width of the other teeth.

Figure 3:
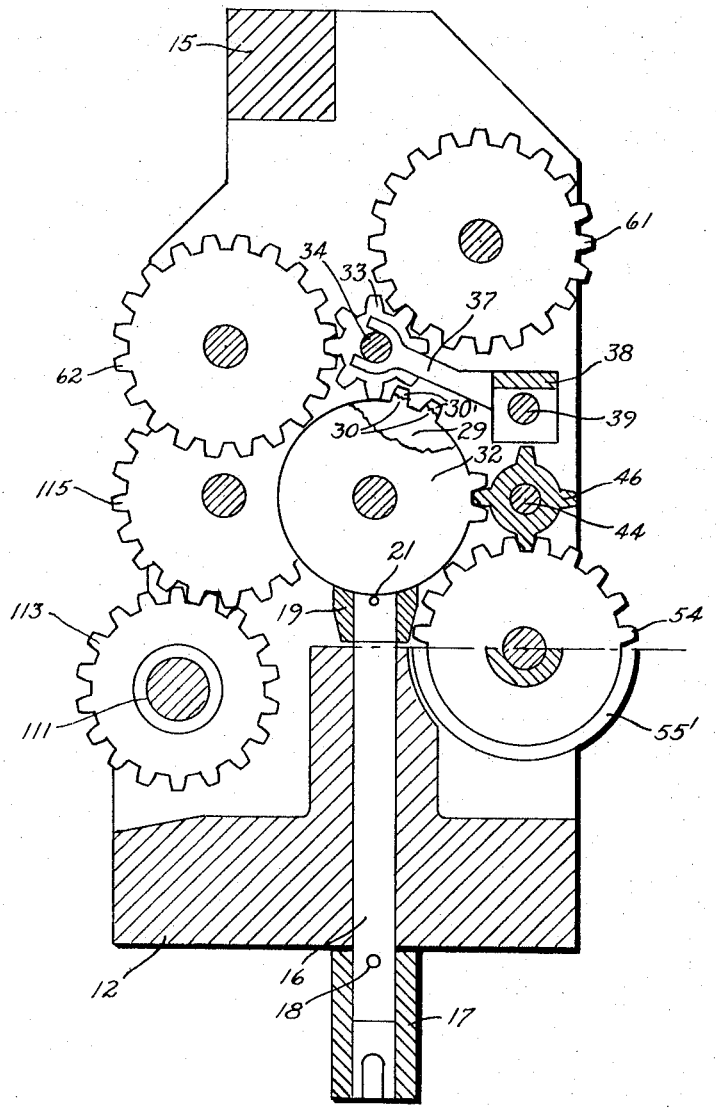
FIG. 3 is a sectional view taken along line 3—3 of FIG. 1.
Figure 4:
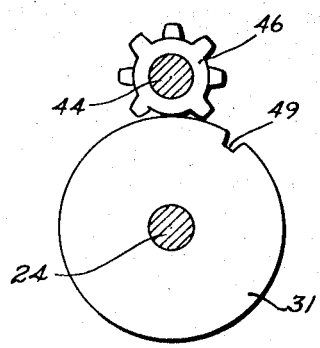
FIG. 4 is a plan view showing a geneva gear and a lock plate.

Referring particularly to FIGS. 1 and 3 of the drawings, there are shown three geneva gears 46, 47, and 48 that are supported on shaft 44. Geneva gear 48 is pinned to shaft 44, while gears 46 and 47 are freely running thereon. By way of example, geneva gears 46, 47, and 48 each have eight teeth with every other tooth being narrower in width than the adjacent teeth. Geneva gear 46 is driven by gear 32, which is part of the reversing drive assembly 28, and as gear 32 has only two teeth, one full revolution of gear 32 will rotate geneva gear 46 a fraction of a revolution. As shown in FIG. 4 of the drawings, lock plate 31 prevents rotation of geneva gear 46, which would otherwise be possible, as geneva gear 46 is not pinned to shaft 44, and is only periodically engaged with geneva gear 32, which has only two teeth. When the teeth of geneva gear 32 engage the teeth of gear 46, a notch 49 on lock plate 31 permits gear 46 to be rotated a quarter of a revolution.

Figure 5:
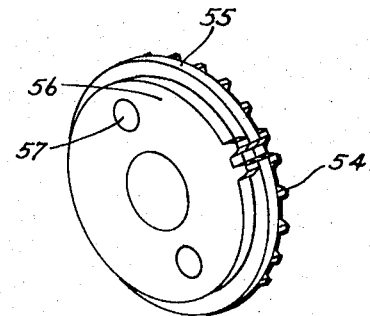
FIG. 5 is a perspective view showing details of a memory assembly.

A pair of memory assemblies 51 and 52, one of which is shown in detail in FIG. 5 of the drawings, are provided on shaft 53. Each memory assembly is comprised of a spur gear 54, lock plate 55, and geneva gear 56. These three elements are fastened together, by means such as rivets 57, and then press fitted onto a spacer 58 that is rotatably mounted on shaft 53. Spur gear 54 is engaged with geneva gear 46, which in effect, serves as an idler between geneva gear 32 and gear 54. As a desired ratio of one to ten is desired, and as geneva gear 32 is provided with two teeth, gear 54 is provided with twenty teeth. Thus ten revolutions of geneva gear 32 drives gear 54 one complete revolution. Likewise, ten revolutions of gear 54 drives gear 54', through geneva gears 56 and 47, one complete revolution, as gear 56 is provided with two teeth and gear 54' is provided with twenty teeth. Lock plate 55 prevents rotation of geneva gear 47, except when the two teeth on gear 56 are engaged with the teeth on gear 47, and likewise, lock plate 55' prevents rotation of geneva gear 48, except when the two teeth on gear 56' are engaged with the teeth on gear 48.

As geneva gear 48 is pinned to shaft 44, any rotation of gear 48 by the two teeth on gear 56' will cause shaft 44 to be rotated a partial turn, and consequently, cam 43 will be rotated. Rotation of cam 43 will impart linear travel to yoke 38 to shift gear 33 to a driver rotating in an opposite direction to a rotating driver with which gear 33 was previously engaged.

Gear 33 meshes with spur gears 61 and 62, which are part of a reading wheel assembly 63 and printing wheel assembly 64, respectively. As shown in FIG. 1 of the drawings, the reading wheel assembly 63 is comprised of dials 65, 66, and 67, which are attached, as by means of rivets 68, to gears 61, 71, and 72, respectively. The reading wheel assembly 63 is rotatably supported on shaft 73, which is supported by side walls 13 and 14, and spacers 74 through 77 are provided to properly position the gears and dials thereon.

Figure 6:
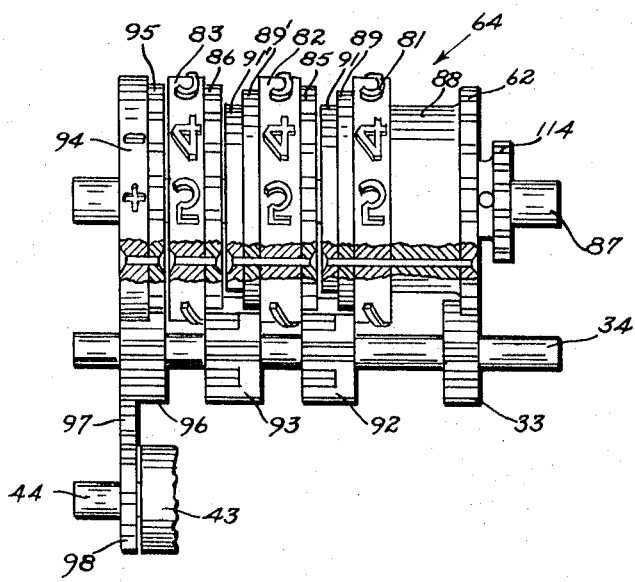
FIG. 6 is a front view of a printing assembly partially broken away to show parts in section.

Referring now to FIG. 6 of the drawings, the printing wheel assembly 64 is shown more in detail. Printing wheels 81, 82, and 83 are attached, as by rivets, to gears 62, 85, and 86, respectively, with gears 85 and 86 being freely rotatable on shaft 87. Printing wheel 81 is spaced from gear 62, by means of spacer 88. Separate lock plates 89 and geneva gears 91 are connected to printing wheels 81 and 82 and these lock plates and geneva gears co-operate with gears 92 and 93 on shaft 34. As geneva gears 91 are provided with only two teeth, ten full revolutions of printing wheel 81 will cause printing wheel 82 to be rotated one complete revolution, and likewise ten full revolutions of printing wheel 82 will cause printing wheel 83 to be rotated one full revolution.

Printing wheel 94, which prints either a plus (+) sign, or a minus (−) sign, is attached to gear 95 and rotatably supported on shaft 87. Gear 95 is driven through gears 96 and 97 by gear 98 which is attached to shaft 44. Thus it can be seen that if a minus (−) sign is being printed, and shaft 44 is then rotated, which indicates a zero position, then printing wheel 94 will be partially rotated so that a plus (+) sign will be printed. Conversely, if a plus (+) sign is being printed and shaft 44 is rotated, printing wheel 94 will be rotated, and a minus (−) sign will then be printed. As shown in FIG. 1 of the drawings, a plus and minus indicator 101 is also provided. Indicator 101 is attached to gear 102, which also meshes with gear 96 on shaft 34.

In addition to providing a visual indicator and printing mechanism for making a permanent record, graphing means are also provided as shown in the drawings. A dotter arm 110, which is continuously rocked, by means not shown, is positioned on lead screw 111 which is rotatably supported in bearings mounted in side wall 14 and arm 112. Gear 113 is attached to lead screw 111, and gear 113 is driven by gear 114 through idler gear 115. Dotter arm 110, which traverses when lead screw 111 is rotated, is comprised of a threaded portion 116 and a spring arm 117 to which a protuberance 118 is attached. Gear 114 is pinned to shaft 87, which is the printing wheel shaft, and consequently, rotation of shaft 87 and the resultant rotation of gears 114, 115 and 113 causes lead screw 111 to be rotated in direct proportion to that of the printing wheels. Thus dotter arm 110, when engaged with a printing ribbon and paper, provides a graph that is a visual representation of the movement of the printing wheel assembly 64.

In a typical operation, the coupling 17, which is attached to input shaft 16, is connected to the output of a temperature recorder and a digit on dial 65 will represent a temperature of one tenth of a degree centigrade. Accordingly, dial 66 will be a units wheel and dial 67 will be a tens wheel. It can be seen then that the counter will indicate from +99.9 degrees centigrade to −99.9 degrees centigrade. As one complete revolution of input shaft 16 will rotate dial 65 one complete turn, which represents one degree of temperature change, it can be seen that the counter could also be readily used with a recorder that is indicating temperature in degrees Fahrenheit.

Assuming now that the counter is showing a temperature above zero, and that the temperature being checked is dropping, a plus (+) sign will be showing and will also be printed by printing wheel 94. One complete revolution of input shaft 16 will revolve dial 65 and printing wheel 81 each one revolution, the drive being through bevel gears 19 and 23, gear 29, and then through gear 33 which meshes with both gear 61 of the reading wheel assembly 63 and gear 62 of the printing wheel assembly 64. As gear 29 is part of the reversing drive assembly 28, one complete revolution of gear 29 will be accompanied by one complete revolution of geneva gear 32, which is provided with two teeth. Upon a complete revolution of geneva gear 32, the two teeth of gear 32 will be engaged with the teeth of geneva gear 46 to drive gear 46 and in turn drive gear 54 of the memory assembly 52. Gear 46, in effect, acts as an idler gear and as gear 54 is provided with twenty teeth, the gear ratio between geneva gears 32 and 54 is 2/20 or one-to-ten. Thus when geneva gear 32 makes ten complete revolutions, geneva gear 54, which is part of the memory assembly 52, will make one full revolution.

As shown in FIGS. 1 and 5 of the drawings, geneva gear 56 is attached to spur gear 54 and one full revolution of gear 54 will also cause geneva gear 56 to be rotated one full revolution. Geneva gear 56, in turn, drives spur gear 54' through geneva gear 47, which acts as an idler gear. As gear 56 is provided with two teeth and gear 54' has twenty teeth, the gear ratio is one-to-ten. Thus ten complete revolutions of gear 54 causes gear 54' to be rotated one complete revolution. It can thus be seen that one hundred turns of input shaft 16 are required in order to rotate gear 54' one full revolution. Gear 54' is part of memory assembly 51, which also is comprised of lock plate 55' and geneva gear 56'. The engagement of gear 56', which has only two teeth, with geneva gear 48, represents a zero position for the counter. As geneva gear 48 is pinned to shaft 44, rotation of gear 48 will cause shaft 44 to be rotated and in turn cam 43 will be rotated. Rotation of cam 43 will in turn cause linear travel of yoke 38 due to the engagement of lug 41 in cam groove 42. As reversing gear 33 is slidably positioned on shaft 34 by fork arm 37, which is part of yoke 38, movement of yoke 38 will also cause reversing gear 33 to be translated and thus gear 33 will disengage gear 29 and engage gear 27. However, as gears 27 and 29 are rotating in opposite directions, the rotation of gear 33 will be reversed, and likewise the direction of rotation of gears 61 and 62, which drive the reading wheel assembly 63 and printing wheel assembly 64, respectively, will be reversed.

Gear 98, which is also pinned to shaft 44, will also be rotated at the zero position to rotate printing wheel 94 and dial 101, both of which have + (plus) and − (minus) signs thereon. The drive is from gear 98 through gear 97 to gear 96 which meshes with both gears 95 and 102, which are attached to printing wheel 94 and dial 101, respectively. As gear 56' is provided with only two teeth, gear 48 and, consequently, shaft 44 is rotated only a partial revolution, however, only a small amount of rotation is required to shift yoke 38 and to rotate printing wheel 94 and dial 101 to their proper positions.

It can thus be seen that function of the memory assemblies 51 and 52 is to "remember" the zero position of the counter, and at the zero position to initiate the action that reverses the rotational direction of the reading wheels and printing wheels. As the memory assemblies receive their drive from geneva gear 32, which is on shaft 24 and part of reversing drive assembly 28, it can be seen that the memory assemblies are always synchronized with reversing gear 33.

In addition to providing a visual output and a printed output, means are also provided for making a graph. A dotter arm 110 is provided which is rocked against a ribbon and paper to produce a record corresponding to the numerical record being printed by the printing wheel assembly 64. As shown in FIG. 6 of the drawings, a pinion gear 114 is pinned to shaft 87 and as gear 62, which is part of the printing wheel assembly 64, is also pinned to shaft 87, it can be seen that rotation of gears 62 and 114 is synchronized. Gear 114 drives lead screw 111 through gears 115 and 113, the latter of which is pinned to lead screw 111.

It can thus be seen that the present invention provides a novel mechanism that will provide a visual output and a printed output consisting of both numbers and a graph. Furthermore, improved means are provided for reversing the outputs at a zero position so that only a single set of wheels are required.

Obviously many modifications and variations of the present invention are possible in the light of the above teachings. It is therefore to be understood, that within the scope of the appended claims, the invention may be practiced otherwise than as specifically described.

What is claimed is:

1. A reversing mechanism for a digital counter comprising: a housing, a first shaft rotatably supported by said housing, first and second output gears separately supported on said first shaft, an input gear for simultaneously rotating said first and second output gears in opposite directions, a second shaft supported by said housing parallel with said first shaft, a reversing gear slidably supported on said second shaft, a third shaft supported by said housing parallel with said first shaft, a yoke slidably mounted on said third shaft and engaging said reversing gear for selectively positioning said reversing gear in engagement with said first and second output gears, a fourth shaft supported by said housing parallel with said first shaft and a memory gear assembly mounted on said fourth shaft and synchronized with said input gear for axially moving said yoke at a predetermined position of said input gear.

2. A digital counter comprising: a housing, a first shaft rotatably supported by said housing, first and second output gears separately supported on said first shaft, an input gear for simultaneously rotating said first and second output gears in opposite directions, a second shaft supported by said housing, a reversing gear slidably supported on said second shaft, a third shaft supported by said housing, a yoke slidably mounted on said third shaft and engaging said reversing gear for selectively positioning said reversing gear in engagement with said first and second output gears, means synchronized with said input gear for axially moving said yoke at a predetermined position of said input gear, a plurality of printing wheels in drivable relation with said reversing gear, and means synchronized with said printing wheels for making a graphical pattern of the rotational position of said input gear.

3. A digital counter as set forth in claim 2 wherein said means synchronized with said printing wheels for making a graphical pattern comprises, a lead screw rotatably supported by said housing, and a dotter arm threadedly attached to said lead screw.

4. Apparatus for indicating the magnitude and direction of the angular displacement of an input shaft from a reference position, comprising, a mechanism connected to said input shaft and being selectively actuatable to transmit rotary motion with or without reversal of direction, a multistage revolution counter connected to the output of said mechanism for indicating the net amount of rotational motion applied thereto, said counter including a movable flag for indicating the direction of the displacement of said input shaft from its reference position, an auxiliary multistage revolution counter driven by said input shaft, cam means driven by the last stage of said auxiliary counter having a reference position corresponding to said reference position of said input shaft, and means operated by said cam means as said cam means passes through said reference position for actuating said reversing mechanism and for moving said flag to change its indication.

5. Revolution counter apparatus adapted automatically to reverse the direction of counting after a predetermined number of input shaft revolutions with continuous input shaft rotation in either direction comprising; first revolution counting means having driving means; an input shaft adapted to be continuously driven in either direction; means coupling said driving means and input shaft including selectively actuable rotation-direction reversing means for reversing the direction of rotation of said driving means; second revolution counting means coupled to said input shaft and driven thereby; and means coupling said second revolution counting means and said reversing means for actuating said reversing means in response to said predetermined number of revolutions of said input shaft in said given direction thereby reversing the direction of rotation of said driving means and the direction of counting of said first revolution counting means.

References Cited

UNITED STATES PATENTS

| 2,005,108 | 6/1935 | Pudelko | 346—66 |
| 2,829,532 | 4/1958 | Togstad | 235—103 |

RICHARD B. WILKINSON, *Primary Examiner.*

L. SMILOW, *Examiner.*

J. A. SPELDRICH, *Assistant Examiner.*